United States Patent [19]

Carobbi et al.

[11] Patent Number: 5,002,613
[45] Date of Patent: Mar. 26, 1991

[54] BORON RESINS OF HIGH SELECTIVE ABSORBENT POWER

[75] Inventors: Renato Carobbi, Pistoia; Franco Innocenti, Bagno a Ripoli, both of Italy

[73] Assignee: Inalco S.P.A., Italy

[21] Appl. No.: 527,886

[22] Filed: May 24, 1990

Related U.S. Application Data

[63] Continuation-in-part of Ser. No. 171,436, Mar. 21, 1988, Pat. No. 4,937,295.

[30] Foreign Application Priority Data

Apr. 3, 1987 [IT] Italy ................. 19966 A/87

[51] Int. Cl.$^5$ .............................. C13J 1/06
[52] U.S. Cl. ........................ 127/46.1; 127/46.2
[58] Field of Search ................. 127/46.1, 46.2

[56] References Cited

U.S. PATENT DOCUMENTS 3,663,659  5/1972  Kray et al.
4,355,140  10/1982  Manziek.
4,506,036  3/1985  Filippini et al.
4,542,161  9/1985  Filippini et al.

FOREIGN PATENT DOCUMENTS 0085836  8/1983  European Pat. Off.
0159521  10/1985  European Pat. Off.

Primary Examiner—Bernard Lipman
Attorney, Agent, or Firm—Arnold, White & Durkee

[57] ABSTRACT

Stable boron resins of high selective absorbent power, their production process, and processes of using said boron resins. The boron resins include a polyacrylic matrix functionalized with quaternary ammonium groups, an epoxy group and phenylboric groups in accordance with general formula (I):

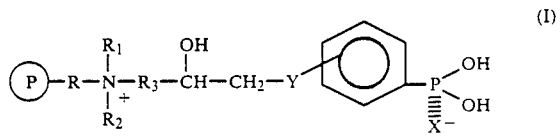

in which P, R, $R_1$, $R_2$, $R_3$, Y and $X^-$ are as defined in the text. The resin is prepared by condensing an acrylic resin with an epihalohydrin and then with a halide or hydroxide of an oxiphenyl-aminophenyl- or thiophenyl-boroxin or their alkyl derivatives. Compared with similar currently known resins, the resins of formula (I) have improved selectivity in sugar preparation. They can be used for purifying lactulose.

7 Claims, No Drawings

BORON RESINS OF HIGH SELECTIVE ABSORBENT POWER

This application is a Continuation-in-Part Application of U.S. Patent Application Ser. No. 07/171,436, filed Mar. 21, 1988, now patented U.S. Pat. No. 4,937,295.

BACKGROUND OF THE INVENTION

This invention relates to new boron resins possessing very high selective absorbent power which are stable in organic solvents and in aqueous acid and alkaline solutions.

More particularly, the invention relates to boron resins consisting of an acrylic polymer matrix functionalized with quaternary ammonium groups, an epoxy group and phenylboric groups of general formula (I):

$$\text{(P)}-R-\underset{\underset{R_2}{|}}{\overset{\overset{R_1}{|}}{N^+}}-R_3-\overset{\overset{OH}{|}}{CH}-CH_2-Y-\underset{X^-}{\bigcirc}-P\overset{OH}{\underset{OH}{\lessgtr}} \quad (I)$$

in which:
P is a polyacrylic matrix,
R is $-(CH_2)_n-$ where n lies between 0 and 5,
$R_1$ and $R_2$, which can be the same or different, are $C_1-C_5$ alkyl,
$R_3$ is $-(CH_2)_n-$ where n varies from 1 to 5,
Y is $-O-$, $-S-$, $$-\underset{\underset{R}{|}}{N}-$$

where R is a $C_1-C_5$ alkyl, and
$X^-$ is an anion chosen from halogens and hydroxyl;

The invention also relates to a process for producing the boron resins defined by general formula (I).

In European Patent 8510934.8 we have already described boron resins with a polyacrylic matrix bifunctionalized with quaternary ammonium groups and alkylphenylboric groups, which possess good chemical and mechanical stability characteristics and can be used in industrial processes, they having a marked selective absorbent action particularly in separating lactulose from its mixtures with other carbohydrates, generally lactose and galactose.

It has now been discovered that boron resins with further improved selectivity in separating sugars can be obtained by the process of the present invention, which is described in detail hereinafter.

DETAILED DESCRIPTION OF THE INVENTION

The boron resins of the present invention are prepared from a polyacrylic resin obtained by cross-linking an acrylic ester with divinylbenzene and preferably having the following characteristics:

| | |
|---|---|
| Percentage of cross-linkage | 4% |
| Mean pore diameter | 1100 Å |
| Specific surface area | 10 m²/g |
| Particle size | 0.2-0.4 mm (90%) |

This resin is firstly subjected to a transamination reaction by reacting with disubstituted diamines.

The aminated acrylic resin is then reacted with an epihalohydrin in an inert solvent such as tetrahydrofuran or dioxane, and the epoxy resin obtained in this manner is reacted at ambient temperature with a boroxin, to produce a resin represented by formula (I).

Alternatively, the chosen boroxin can firstly be reacted with an epihalohydrin to obtain an intermediate of general formula (II):

$$\text{Hal-}R_3-\overset{\overset{OH}{|}}{CH}-CH_2-Y-\underset{X^-}{\bigcirc}-P(OH)_2 \quad (II)$$

and this can be reacted with the aminated polyacrylic resin, to obtain a boron resin corresponding to general formula (I).

The preferred conditions for implementing the individual process steps of the two alternatives indicated schematically heretofore are as follows:

(a) Transamination reaction: this is conducted by known methods, by reacting the polyacrylic matrix with a disubstituted diamine, to obtain an aminated acrylic resin of general formula:

$$\text{(P)}-R-N\overset{R_1}{\underset{R_2}{\diagdown}}$$

where P, R, $R_1$ and $R_2$ have the aforesaid meanings.

(b) Reaction of the aminated acrylic resin with an epihalohydrin: the aminated acrylic resin is pretreated by a process comprising regenerating in Cl form by reaction with a dilute NaCl and HCl solution at about ambient temperature, washing with demineralized water until neutral, regenerating in OH form by treatment in aqueous ammonia at about ambient temperature, washing with demineralized water until neutral, washing with acetone and drying under vacuum.

At this point the resin is placed in a polar aprotic solvent, such as dioxane, and heated under reflux with epichlorohydrin dissolved in the same solvent and a catalytic quantity of potassium iodide, heating under reflux to between 40° and 100° C. for 15–25 hours. After filtration and washing repeatedly with the same solvent, the crude product is ready for the subsequent reactions.

(c) Reaction with the boroxin: the resin obtained in (b) is treated, in suspension in an organic solvent of the type used in (b), with the chosen boroxin at a temperature of between 50° and 100° C. for 36–48 hours.

After cold filtration, the product is washed repeatedly with the same solvent and then with a dilute sodium hydroxide solution.

It is finally washed with water until alkaline reactions disappear.

Alternatively:

(a') Transamination reaction as in (a)

(b') Reacting the chosen boroxin with an epihalohydrin. This reaction takes place in an aliphatic hydrocarbon or chlorinated solvent at a temperature of between 0° and 10° C. for 10–15 hours.

After distilling off the solvent under reduced pressure, the product is taken up in a chlorinated aliphatic solvent, then again distilling to eliminate the excess epichlorohydrin.

A dense oil is obtained from which the required product is crystallized using a chlorinated aliphatic solvent.

(c') Reacting the product obtained in (b') with the aminated acrylic resin.

The aminated acrylic resin, pretreated as described in (b), is placed in a solvent of the type used in (b), for example dioxane, a product such as that obtained in (b') is added, together with a catalytic quantity of potassium iodide, and the mixture heated under reflux to a temperature of between 40° and 80° C. for 15-25 hours.

After cold filtration, the product is washed repeatedly with the same solvent and finally with solvent to which hydrochloric acid has been added, to obtain the required product.

The reaction sequence involved in the first alternative is for example the following:

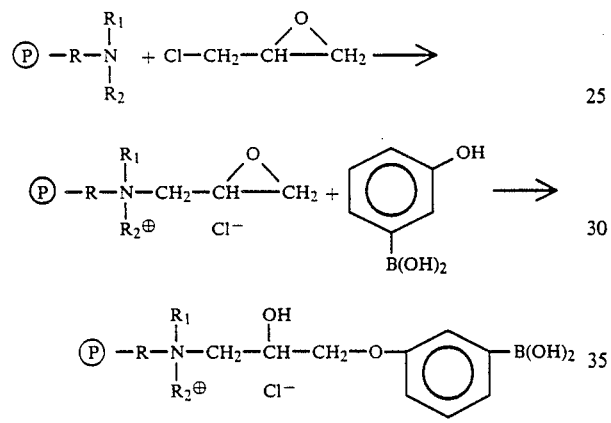

The reaction sequence involved in the second alternative is for example the following:

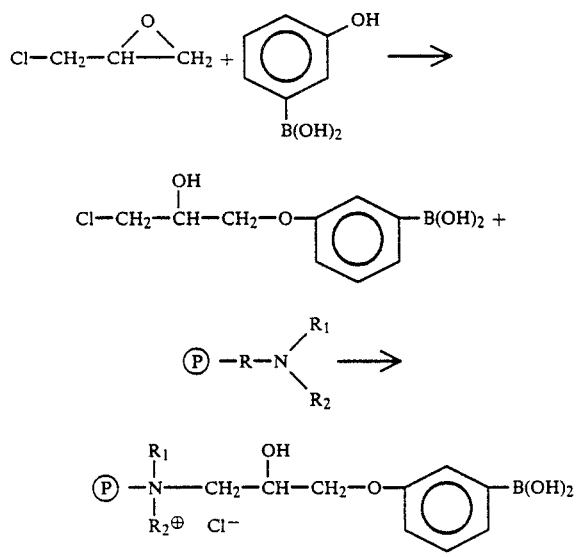

Some practical embodiments of the processes and resin of the present invention are given hereinafter in order to make the processes and resin more easily reproducible.

EXAMPLE 1

(a) Preparation of the polyacrylic matrix

A mixture consisting of 50 g of methylacrylate, 2 g of 1,4-divinylbenzene, 1 g of 1,4-ethylvinylbenzene and 1 g of benzoyl peroxide in 250 ml of a 0.2% aqueous solution of polyvinyl alcohol is fed into a 500 ml flask fitted with an agitator, thermometer and condenser.

It is heated for 20 minutes to 50° C. and then overnight to 90° C. under suitable agitation. The product formed is filtered off, washed with deionized water, alcohol and ethyl ether, and dried at 50° C. in an oven under vacuum for 5 hours.

47 g of copolymer are obtained, having the following characteristics:

| | |
|---|---|
| percentage of cross-linkage | 4% |
| mean pore diameter | 1100 |
| specific surface area | 10 m$^2$/g |
| particle size | 0.2-0.4 mm (90%) |

(b) Preparation of the aminated resin

The copolymer of step (a) is swollen for 4 hours in 400 ml of dimethylformamide and is then fed into a 50 ml flask fitted with a mechanical stirrer, thermometer and condenser with a calcium chloride tube. 45 g of dimethylethyldiamine and 0.5 g of $K_2CO_3$ as catalyst are added.

It is kept overnight at 15° C. under agitation, after which it is allowed to cool, the product filtered off and washed with dimethylformamide, water, 4% NaOH and then again with water until neutral, then with alcohol, and is dried in an oven under vacuum at 60° C. for 4 hours. 45 g of amine resin are obtained having the following characteristics:

| | |
|---|---|
| N(CH$_3$)$_2$ | 6 meq/g of dry resin |
| mean pore diameter | 1000 Å |
| specific surface area | 12 m$^2$/g |
| particle size | 0.2-0.4 mm (80%) |

(c) Preparation of the epoxy resin 45 g of acrylo-amine resin from step (b) are subjected to the following sequence of operations:

the resin is regenerated in Cl$^-$ form by treatment with 130 ml of a NaCl solution of 100 g/l concentration at a temperature of 20° C. for 60 minutes; the regeneration is completed by treatment with 150 ml of a 10% HCl solution at a temperature of 20° C. for 40 minutes;

the resin is washed with demineralized water until neutral;

the resin is regenerated in OH$^-$ form by treatment with 200 ml of an NH$_3$ solution of 40 g/l concentration at a temperature of 20° C. for 90 minutes;

the resin is washed with demineralized water until neutral;

it is washed with acetone and dried by heating under vacuum at 55° C. for 8 hours;

200 ml of dioxane are added to the resin and the resin left n the dioxane at ambient temperature for 24 hours.

40 grams of resin pretreated in this manner, corresponding to 160 ml, are fed into a glass flask fitted with a reflux condenser, a CaCl$_2$ tube, thermometer and mechanical agitator.

120 ml of epichlorohydrin dissolved in 500 ml of dioxane and 20 g of potassium iodide are added, the mixture suitably agitated and kept at 50° C. for 24 hours.

On termination of the reaction, the mixture is filtered through a Buchner funnel and washed by washing three times successively with 500 ml of dioxane each time, followed by filtration.

The product is used crude in the next reaction.

(d) Preparation of epoxyaminoboron resin

The crude epoxy resin from the preceding reaction is placed in 1000 ml of dioxane. 120 g of m-aminobenzeneboronic acid are then added.

The suspension is heated to 80° C. and kept under agitation for 42 hours.

On termination of the reaction the mixture is filtered cold through a Buchner funnel, the residue obtained is taken up in 1000 ml of a dioxane/0.2N NaOH mixture and again filtered. The product is then washed with 1000 ml of a 0.2N NaOH solution, the resin filtered through a Buchner funnel and washed abundantly with water until alkaline reaction in the filtrate disappears.

In this manner 55 g of resin are obtained with a volume of about 210 ml.

The resin has the following characteristics:

| degree of functionalization | 4.1 meq of boron per gram of dry resin |
| --- | --- |
| percentage of cross-linkage | 4% |
| pore diameter | 1000 |
| specific surface area | 20 m²/g |
| apparent density | 0.75 g/ml |
| real density | 1.4 g/ml |
| particle size | 0.2–0.4 mm (80%) |

(e) Preparation of epoxy oxy-boron resin

The crude resin from the preceding reaction is placed in 1000 ml of dioxane. 120 g of m-hydroxyboronic acid are then added.

The suspension is heated to 80° C. and kept under agitation for 42 hours.

On termination of the reaction the mixture is filtered cold through a Buchner funnel, the residue obtained is taken up in 1000 ml of a dixoane/0.2N NaOH mixture and again filtered.

The product is then washed with 1000 ml of a 0.2N NaOH solution, the resin filtered through a Buchner funnel and washed abundantly with water until alkaline reaction of the filtrate disappears.

55 g of resin are thus obtained with a volume of about 210 ml.

The resin has the following characteristics:

| degree of functionalization | 4.4 meq of boron per gram of dry resin |
| --- | --- |
| percentage of cross-linkage | 4% |
| pore diameter | 1000 |
| specific surface area | 20 m²/g |
| apparent density | 0.81 g/ml |
| real density | 1.35 g/ml |
| particle size | 0.2–0.4 mm (80%) |

EXAMPLE 2

(b) Preparation of the intermediate

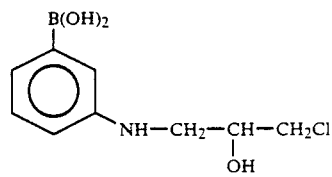

50 g of m-aminobenzeneboronic acid are placed in a 250 ml flask and 150 ml of epichlorohydrin are added.

The mixture is cooled to 0°–10° C. and kept at this temperature for 12 hours.

On termination, the solvent is distilled off under vacuum and the residue taken up in dichloropropane, again distilling to remove excess epichlorohydrin.

The dense oil obtained is crystallized from methylene chloride. 32 g of the product concerned are obtained, with an M.P of 78°–80° C.

| Elementary analysis for C₉H₁₃ClBNO₃ M.W. 229.26: | | | |
| --- | --- | --- | --- |
| Calculated: | C 47.1 | N 6.1 | H 5.67 |
| Found: | C 47.6 | N 5.7 | H 5.6 |

(b) Preparation of the intermediate

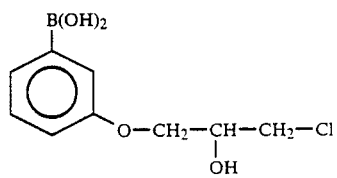

50 g of m-hydroxybenzeneboronic acid are placed in a flask and 150 ml of epichlorohydrin are added.

The mixture is heated to 30°–40° C. and kept at this temperature for 8 hours.

On termination, the solvent is distilled off under vacuum. The oily residue is taken up in 300 ml of ethanol at 50°–60° C., treated with active carbon and filtered.

The clear solution obtained is concentrated to one half its volume, and left standing at 2°–3° C. overnight.

In this manner 42 g of product precipitate and are crystallized from methylene chloride (180 ml) to obtain 38 g of the required product. M.P. 102°–105° C.

| Elementary analysis for C₉H₁₂ClBO₄ M.W. 230.26: | | | |
| --- | --- | --- | --- |
| Calculated: | C 46.4 | N 5.2 | Cl 15.39 |
| Found: | C 46.7 | N 5.1 | Cl 15.6 |

(c) Preparation of epoxy-oxy-boron resin

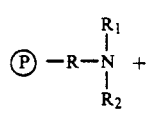

-continued

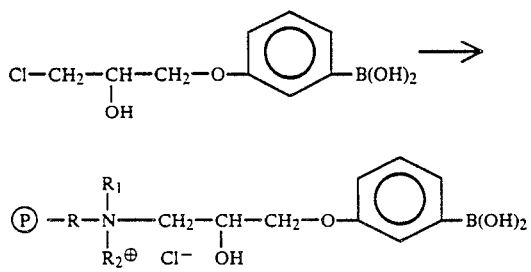

45 g of acrylo-amine resin are subjected to the following sequence of operations:

the resin is regenerated in Cl⁻ form by treatment with 130 ml of an NaCl solution of 100 g/l concentration at a temperature of 20° C. for 60 minutes; the regeneration is completed by treatment with 150 ml of a 10% HCl solution at a temperature of 20° C. for 40 minutes;

the resin is washed with demineralized water until neutral;

the resin is regenerated in OH form by treatment with 200 ml of an NH$_3$ solution of 40 g/l concentration at a temperature of 20° C. for 90 minutes;

the resin is washed with demineralized water until neutral;

it is washed with acetone and dried by heating under vacuum to 55° C. for 8 hours;

200 ml of dioxane are added to the resin and the resin left in dioxane at ambient temperature for 24 hours.

40 grams of resin pretreated in this manner, corresponding to 160 ml, are fed into a glass flask fitted with a reflux condenser, a CaCl$_2$ tube, thermometer and mechanical agitator.

1200 ml of dioxane, 65 g of the product of point (b) and 21.8 g of KI are then added. The mixture is suitably agitated, heated to 50° C. and kept under these conditions for 24 hours.

On termination of the reaction, the mixture is filtered through a Buchner funnel and washed by three successive washing and refiltering operations, the first washing being in 500 ml of dioxane, the second in 400 ml of dioxane/0.1N HCl mixture in a 2/1 volume ratio, and the third in 300 ml of 0.1N HCl.

53 g of resin are obtained with a volume of 200 ml; the resin is of cream color with a certain quantity of light brown beads, and has the following characteristics:

| | |
|---|---|
| degree of functionalization | 4.8 meq of B per gram of dry resin |
| percentage of cross-linkage | 4% |
| pore diameter | 1000 Å |
| specific surface area | 20 m$^2$/g |
| apparent density | 0.81 g/ml |
| real density | 1.35 g/ml |
| particle size | 0.2–0.4 mm (80%) |

EXAMPLE 3

A boron resin of the characteristics of example 1d is rehydrated in deionized water for 8 hours.

100 cc of this resin are placed in a 26 mm diameter column and fed for 60 minutes with 45 cc of a lactulose syrup solution (lactulose 50% by weight, lactose 4% by weight, galactose 4.5% by weight, other sugars 7% by weight) diluted 1 to 2 with deionized water and alkalinized to give a final solution of pH 8. By elution with a mobile phase of the same pH, 180 cc of a solution are obtained containing 21.6 g of unretained sugars, comprising:

| | |
|---|---|
| lactulose | 17.8 g |
| lactose | 2.1 g |
| galactose | 1.7 g |

The column is then eluted with a 1N HCl solution to obtain 150 cc of lactose-free solution containing:
lactulose 11.7 g
galactose 0.25 g

EXAMPLE 4

A boron resin of the characteristics of example 1e is rehydrated with deionized water for 8 hours.

100 cc of this resin are placed in a 26 mm diameter column and fed for 60 minutes with 45 cc of a lactulose syrup solution (lactulose 50%, lactose 1% by weight, galactose 4.5% by weight, other sugars 7% by weight) diluted 1 to 2 with deionized water and alkalinized to give a final solution of pH 8. By elution with a mobile phase of the same pH, 180 cc of a solution are obtained containing 20.8 g of unretained sugars, comprising:

| | |
|---|---|
| lactulose | 16.8 g |
| lactose | 2.1 g |
| galactose | 1.9 g |

The column is then eluted with a 1N HCl solution to obtain 150 cc of a lactose-free solution containing:
lactulose 12.5 g
galactose 0.3 g Due to their high selective absorbent power, the boron resins of the present invention are particularly suitable for separating carbohydrate mixtures, particularly for purifying lactulose containing solutions.

It is therefore another object of the present invention to provide a method for purifying an aqueous lactulose syrup containing other carbohydrates, which comprises the steps of:

(a) activating a boron resin of general formula (I)

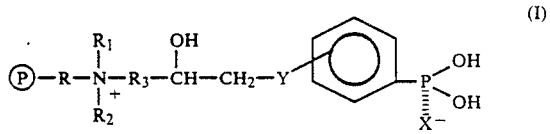

in which:
P is a polyacrylic matrix,
R is —(CH$_2$)$_n$— where n lies between 0 and 5,
R$_1$ and R$_2$, which can be the same or different, are C$_1$–C$_5$ alkyl,
R$_3$ is —(CH$_2$)$_n$ where n varies from 1 to 5,
Y is —O—, —S—,

where R is a C$_1$–C$_5$ alkyl, and
X is an anion chosen from halogens and hydroxyl; by salifying the resin with HCl 1N, then by treating with deionized water up to a pH value of the eluate higher than 5, then with NaOH 0.2N and finally with deionized water up to a pH value of the eluate lower than 9;

(b) contacting an aqueous lactulose syrup containing from 20% to 40% by wt. of lactulose and from 5% to 30% by wt. of other carbohydrates with said activated boron resin;

(c) eluting the carbohydrates absorbed on the boron resin with water and then with HCl from 0.5N to 1N, separately collecting the eluates.

In the preferred embodiments of the invention, the boron resin is loaded in a column, activated as described above and then the impure lactulose solution is percolated therethrough. The rate of percolation is controlled between 0.5 and 3 volumes of syrup/volume of resin per hour.

The temperature of the percolation is not a critical factor and can be comprised between 10° and 60° C. without any significant effect on the absorption capacity of the resin.

The lactulose is strongly and preferably absorbed by the boron resins of the invention in an amount of from 50 to 250 g/lt of resin, independently from the presence of other carbohydrates in the impure solution.

It is thus possible to separate the other carbohydrates from lactulose by eluting the column with 2 to 4 volumes of water per resin volume, so obtaining a solution containing the larger amount of the impurities contained in the original impure syrup.

The resin is then eluted from 1.3 to 2.5 volumes of an aqueous solution of from 0.5 to 1N HCl per volume of resin by recovering a solution of lactulose with a very low content of other carbohydrates.

In the preferred embodiments of the invention, the solution of lactulose recovered by means of the HCl treatment are divided in two fractions: the first one up to a pH value of the eluate higher or equal to 3 and the second one with a pH value of the eluate lower than 3. The second fraction of the eluate contains lactulose without any trace of lactose.

EXAMPLE 5-8

100 ml of a boron resin of the characteristics of example 1d are placed in a 26 mm diameter column, salified with HCl 1N, washed with deionized water up to a pH value of the eluate equal to 5, treated with 1,000 ml of 0.2N NaOH and then washed again with water up to a pH value of the eluate equal to 9.

The column is fed for 60 minutes with 100 ml of a lactulose syrup solution containing 30 g of lactulose, 2.3 g of galactose and 2.3 g of lactose.

The column is eluted with 180 ml of deionized water and the eluate collected (eluate A), then with 90 ml of 1N HCl up to a pH value of the effluent from the column equal to 3 and the eluate collected (eluate B) and finally with 110 ml of 1N HCl and the eluate (having a pH lower than 3) is collected (eluate C).

The same procedure as above was repeated by changing the concentrations and the type of carbohydrates different from lactulose.

The characteristics of starting products and of the obtained eluates are reported in the following Table 1, together with the volumes of crude syrups and of eluates A, B and C.

TABLE 1

| Ex N. | Product volume (ml) | lactulose (g) | galactose (g) | tagatose (g) | lactose (g) |
|---|---|---|---|---|---|
| 5 | Crude syrup 100 ml | 30 | 2.3 | — | 2.3 |
|   | eluate A 180 ml | 17.8 | 1.9 | — | 2.2 |
|   | eluate B 90 ml | 8.2 | 0.1 | — | — |
|   | eluate C 110 ml | 3.5 | 0.15 | — | — |
| 6 | Crude syrup 200 ml | 60 | 4.6 | — | 4.6 |
|   | eluate A 310 ml | 48.1 | 4.4 | — | 4.6 |
|   | eluate B 90 ml | 8.7 | — | — | — |
|   | eluate C 110 ml | 3.2 | 0.2 | — | — |
| 7 | Crude syrup 50 ml | 15 | 1.2 | — | 1.2 |
|   | eluate A 120 ml | 6.3 | 0.5 | — | 0.7 |
|   | eluate B 90 ml | 6.9 | — | — | 0.4 |
|   | eluate C 110 ml | 1.8 | 0.7 | — | — |
| 8 | Crude syrup 100 ml | 30 | 2.1 | 1.0 | 2.1 |
|   | eluate A 160 ml | 18.5 | 1.6 | — | 2.0 |
|   | eluate B 90 ml | 8.0 | — | 0.6 | — |
|   | eluate C 100 ml | 3.2 | 0.5 | 0.4 | — |

EXAMPLE 9-12

100 ml of a boron resin of the characteristics of example 1e are placed in a 26 mm diameter column, salified with HCl 1N, washed with deionized water up to a pH value of the eluate equal to 5, treated with 1000 ml of 0.2N NaOH and then washed again with water up to a pH value of the eluate equal to 9. The column is fed for 60 minutes with 50 ml of a lactulose syrup solution containing 15 g of lactulose, 1.2 g of galactose and 1.2 g of lactose.

The column is eluted with 95 ml of deionized water and the eluate collected (eluate A), then with 95 ml of 1N HCl up to a pH value of the effluent from the column equal to 3 and the eluate collected (eluate B) and finally with 85 ml of 1N HCl and the eluate (having a pH lower than 3) is collected (eluate C). The same procedure as above was repeated by changing the concentrations and the type of carbohydrates different from lactulose.

The characteristics of starting products and of the obtained eluates are reported in the following Table 2, together with the volumes of crude syrups and of eluates A, B and C.

TABLE 2

| Ex N. | Product volume ml | lactulose (g) | galactose (g) | tagatose (g) | lactose (g) |
|---|---|---|---|---|---|
| 9 | Crude syrup 50 ml | 15 | 1.2 | — | 1.2 |
|   | eluate A 95 ml | 0.7 | — | — | 1.1 |
|   | eluate B 95 ml | 8.3 | — | — | — |
|   | eluate C 85 ml | 5.7 | 1.1 | — | — |
| 10 | Crude syrup 100 ml | 30 | 2.4 | — | 2.4 |
|   | eluate A 160 ml | 10.5 | — | — | 2.2 |

TABLE 2-continued

| Ex N. | Product volume ml | lactulose (g) | galactose (g) | tagatose (g) | lactose (g) |
|---|---|---|---|---|---|
| | eluate B 90 ml | 10.2 | 0.4 | — | — |
| | eluate C 105 ml | 9.0 | 1.9 | — | — |
| 11 | Crude syrup 200 ml | 60 | 4.6 | — | 4.8 |
| | eluate A 340 ml | 42.5 | — | — | 4.7 |
| | eluate B 90 ml | 14.1 | 0.8 | — | — |
| | eluate C 175 ml | 3.2 | 3.8 | — | — |
| 12 | Crude syrup 50 ml | 15 | 1.2 | 0.7 | 1.2 |
| | eluate A 90 ml | 0.6 | — | — | 1.0 |
| | eluate B 85 ml | 8.1 | — | — | — |
| | eluate C 100 ml | 6.1 | 1.0 | 0.6 | — |

We claim:

1. A method for purifying an aqueous lactulose syrup containing other carbohydrates, said method comprising the steps of:
(a) activating a boron resin of general formula (I)

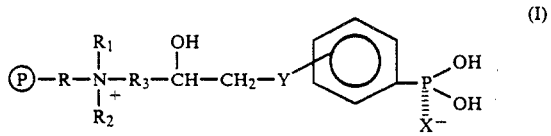

in which
P is a polyacrylic matrix,
R is $-(CH_2)_n-$ where n lies between 0 and 5,
$R_1$ and $R_2$, which can be the same or different, are $C_1$–$C_5$ alkyl,
$R_3$ is $-(CH_2)_n$ where n varies from 1 to 5,
Y is $-O-$, $-S-$,

where R is a $C_1$–$C_5$ alkyl,
X— is an anion chosen from halogens and hydroxyl; by salifying the resin with HCl 1N, then by treating with deionized water up to a pH value of the eluate higher than 5, then with NaOH 0.2N and finally with deionized water up to a pH value of the eluate lower than 9;
(b) contacting an aqueous lactulose syrup containing from 20% to 40% by wt. of lactulose and from 5% to 30% by wt. of other carbohydrates with said activated boron resin; and
(c) eluting the carbohydrates absorbed on the boron resin with water and then with HCl from 0.5N to 1N, separately collecting the eluates.

2. The method of claim 1, wherein said aqueous lactulose syrup is percolated through said boron resin at a rate of from 0.5 to 3 volumes of syrup/volume of resin per hour.

3. The method of claim 1, wherein the carbohydrates absorbed on the boron resin are eluted with from 2 to 4 volumes of water per resin volume to obtain an aqueous solution of lactulose strongly enriched in other carbohydrates.

4. The method of claim 1, wherein the carbohydrates absorbed on the boron resin are eluted with from 1.3 to 2.5 volumes of an aqueous solution of 0.5 to 1N HCl per volume of resin by recovering a solution of lactulose with a very low content of other carbohydrates.

5. The method of claim 1, wherein the carbohydrates absorbed on the boron resin are eluted with an aqueous solution of 0.5 to 1N HCl by collecting a first eluate having a pH value higher or equal to 3 and then a second eluate having a pH value lower than 3, this second eluate consisting of a solution of lactulose free from lactose.

6. A method of separating carbohydrate mixtures comprising the steps of:
contacting a mixture of carbohydrates with a boron resin of general formula (I)

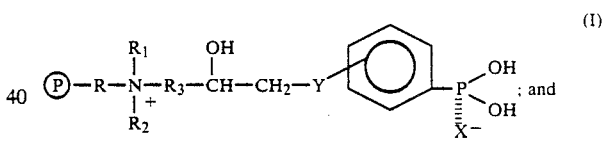

eluting the carbohydrate/resin system with acid to separate certain carbohydrates from others.

7. The method of claim 6, wherein the carbohydrate mixture comprises a lactulose solution comprising lactulose, lactose, galactose, other sugars and water, and after eluting with acid the lactose is removed from the lactulose solution.

* * * * *